(12) United States Patent
Chi et al.

(10) Patent No.: US 6,368,365 B1
(45) Date of Patent: Apr. 9, 2002

(54) METHOD OF MAKING A BATTERY

(75) Inventors: Ignacio Chi, Dracut; George Cintra, Holliston, both of MA (US); Jean Golay, Woodbury, CT (US); Geoffrey Heyn, Sherborn; Marc J. Sinclair, Acton, both of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/532,280

(22) Filed: Mar. 23, 2000

(51) Int. Cl.[7] .................. H01M 12/00; B29C 47/00; C04B 35/00
(52) U.S. Cl. ................ 29/623.1; 156/244.24; 156/244.27; 264/104; 264/105; 264/210.2
(58) Field of Search .................. 29/623.1; 156/244.27, 156/244.26, 244.24; 264/104, 105, 210.2

(56) References Cited

U.S. PATENT DOCUMENTS

| | | | |
|---|---|---|---|
| 4,121,020 A | 10/1978 | Epstein et al. | |
| 4,317,789 A | 3/1982 | Groult et al. | |
| 4,320,184 A | 3/1982 | Bernstein et al. | |
| 4,320,185 A | 3/1982 | Bernstein et al. | |
| 4,385,019 A | 5/1983 | Bernstein et al. | |
| 4,440,835 A | 4/1984 | Vignaud | |
| 4,457,953 A | 7/1984 | McIntyre et al. | |
| 4,556,618 A | 12/1985 | Shia | |
| 5,312,701 A | 5/1994 | Khasin et al. | |
| 5,393,617 A | 2/1995 | Klein | |
| 5,441,823 A | 8/1995 | Naimer et al. | |
| 5,571,640 A | 11/1996 | Takeuchi et al. | |
| 6,054,230 A | * 4/2000 | Kato | 429/33 |

* cited by examiner

Primary Examiner—John S. Maples
(74) Attorney, Agent, or Firm—Fish & Richardson P.C.

(57) ABSTRACT

A method of making a cathode assembly for a metal-air battery includes extruding a composition having a catalyst, a fibrillatable material, and a lubricant, to form an extrudate; calendering the extrudate; connecting the extrudate to a current collector; and heating the extrudate to remove at least a portion of the lubricant to make the cathode assembly. The method can further include laminating a separator to the cathode assembly.

35 Claims, 1 Drawing Sheet

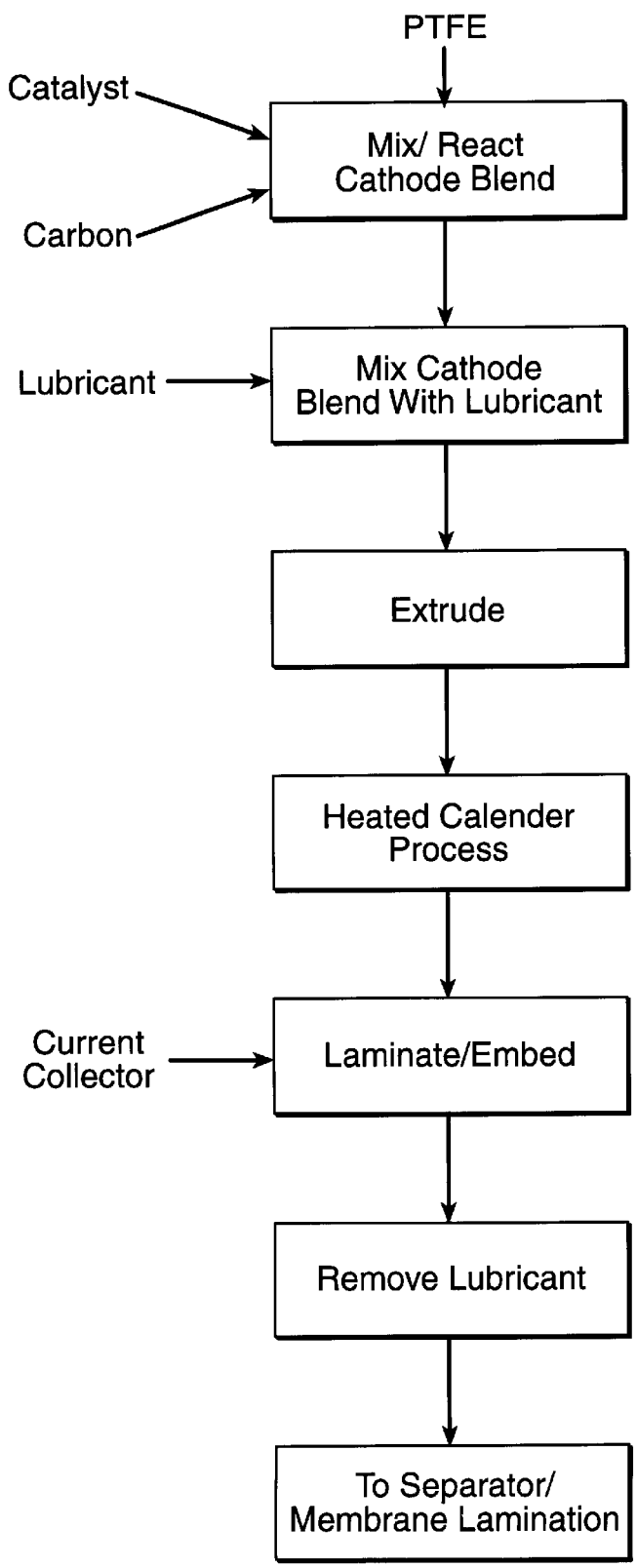
FIGURE

METHOD OF MAKING A BATTERY

BACKGROUND

This invention relates to batteries.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a sheet-like layer, typically called the separator.

When a battery is used as an electrical energy source in a device, such as a hearing aid or a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

In a metal-air electrochemical cell, the cathode structure contains a material that can catalyze the reduction of oxygen, which enters the cell as a component of atmospheric air passing through access ports in the container. Zinc oxide or zincate is formed in the anode. Thus, the overall electrochemical reaction within the cell results in zinc metal being oxidized to zinc ions and oxygen from the air being reduced to hydroxyl ions. While these chemical reactions are taking place, electrons are transferred from the anode to the cathode, providing power to the device.

SUMMARY OF THE INVENTION

The invention relates to a method of making a cathode assembly for a metal-air battery. The method includes extruding a composition having a catalyst, a fibrillatable material, and a lubricant, to form an extrudate; calendering the extrudate; connecting the extrudate to a current collector; and heating the extrudate to remove at least a portion of the lubricant to make the cathode assembly. The method can further include laminating a separator to the cathode assembly.

The method can be used to produce a thin, strong, and self-supporting cathode. The cathode can be made uniform to provide reliable battery performance. The cathode is flexible, allowing the cathode to be formed in different shapes.

The preferred catalyst is manganese oxide. The preferred fibrillatable material is polytetrafluoroethylene. The preferred lubricant is an iso-paraffinic solvent.

The extrusion can be performed, for example, by ram extrusion or screw extrusion, at less than room temperature or greater than room temperature. Extruding the composition fibrillates the fibrillatable material to produce a strong cathode assembly.

Calendering of the extrudate can include passing the extrudate between rollers at a temperature greater than room temperature. The rollers can be moving at the same speed or at different speeds, for example, at a speed differential of 1.05–1.20:1, to produce a cathode with asymmetrical hardness. Calendering the extrudate produces a thin and uniform cathode that provides reliable battery performance. A thin cathode allows more active material (e.g., anode material) to be placed in the battery, thereby increasing the battery's capacity.

The extrudate can be connected to the current collector by embedding the current collector to the extrudate such that the thickness of the extrudate can remain substantially unchanged after being embedded with the current collector. Embedding the current collector to the extrudate can be performed by pressing the current collector and the extrudate between rollers.

The extrudate can be heated after lamination. Heating of the extrudate can remove substantially all of the lubricant from the extrudate.

In another aspect, the invention relates to a method of making a cathode for a metal-air battery including extruding a composition having a catalyst, a fibrillatable material, and a lubricant, to form an extrudate; calendering the extrudate between rollers; and pressing the extrudate to a current collector between rollers. The method can further include heating the extrudate to remove at least a portion of the lubricant.

In another aspect, the invention relates to a method of making a metal-air battery. The method includes making a cathode assembly by extruding a composition having a catalyst, a fibrillatable material, and a lubricant, to form an extrudate; calendering the extrudate; connecting the extrudate to a current collector; and heating the extrudate to remove at least a portion of the lubricant to make the cathode assembly; placing the cathode assembly in a housing comprising air access openings such that air entering the housing contacts the cathode assembly; placing a separator adjacent to the cathode assembly; and placing an anode adjacent to the separator. The anode can include zinc. The catalyst can include manganese oxide.

Other features, objects, and advantages of the invention will be apparent from the description and drawings, and from the claims.

DESCRIPTION OF DRAWINGS

The FIGURE is a block diagram of an embodiment of a process for making a cathode.

DETAILED DESCRIPTION OF THE PREFERRED EMBODIMENTS

Referring to the FIGURE, a process for making a cathode assembly for a battery includes forming a cathode blend having a catalyst, a fibrillatable material, and a lubricant. The cathode blend is extruded to form an extrudate (e.g., a tape) wherein the fibrillatable material is fibrillated. The extrudate is calendered under heat to reduce the thickness of the extrudate and to remove at least a portion of the lubricant from the extrudate. The calendered extrudate is then laminated to a current collector (e.g., expanded metal or a woven mesh) to form a cathode assembly, which is heated to remove more lubricant. The resulting cathode assembly can be laminated with a separator and/or a membrane and be used in, for example, a metal-air battery.

The cathode blend includes a catalyst, carbon, a fibrillatable material, and a lubricant.

Any of the conventional forms of catalysts used for cathodes can be used. Examples of catalysts include noble metals (e.g., Pt, Pd, and Ru); silver-based catalysts; permanganates (e.g., $AgMnO_4$ and $KMnO_4$), and decomposition products of metal heterocycles (e.g., iron tetraphenylporphyrin, cobalt tetramethoxyphenylporphyrin, cobalt pthalocynanine, and iron pthalocynanine); and napthenates (e.g., cobalt napthenate and manganese napthenate). A preferred catalyst includes manganese oxides such as $MnO_2$, $Mn_2O_3$, and mixtures of manganese oxides. The preferred manganese dioxide is electrolytically synthesized manganese dioxide (EMD), although chemically synthesized manganese dioxide (CMD) and blends of EMD and CMD can also be used. Distributors of such manganese dioxides include Kerr McGee, Co. (Trona D), Chem Metals, Co., Tosoh, Delta Manganese, Mitsui Chemicals and JMC. In addition, the manganese oxide can be formed in the cathode blend in situ, for example, by decomposing a blend of manganese nitrate, carbon and a fibrillatable material. Generally, the cathode includes, for example, between about 5% and about 20% of manganese dioxide by weight.

The carbon also can be any of the conventional carbon used in cathodes. Adding carbon to the cathode blend provides effective electronic conductivity. Carbon also acts as sites for the reduction of oxygen and as sites on which the catalyst deposits to decompose peroxides in the cell. The preferred carbon is carbon black. Examples of carbon that may be used include, but are not limited to, Black Pearls 2000 (Cabot, Billerica, Mass.), Vulcan XC-72 (Cabot), Monarch 1300, Shawinigan Black, Printex, Ketjen Black, and PWA. Generally, the cathode includes, for example, between 10% and 90% of carbon particles by weight, preferably between about 30% and about 70%, and more preferably, about 40%.

The cathode blend includes a fibrillatable material that form fibers or fibrillates when exposed to forces, such as shearing forces during extrusion, molding, or calendering. When the fibrillatable material fibrillates, it can strengthen the cathode blend. An example of a fibrillatable material is polytetrafluoroethylene (PTFE), available from DuPont (Wilmington, Del.). Generally, the cathode includes, for example, between 10% to about 90% of fibrillatable material by weight, preferably between 20% to about 80%, and more preferably, a between about 45 to about 50%.

Different fibrillatable materials can be selected to control the strength of the fibers and the degree of fibrillation. Generally, high molecular weight fibrillatable materials can fibrillate faster and can produce stronger fibers and/or more fibers. Low molecular weight fibrillatable materials generally form shorter and weaker fibers, which may make processing easier. For example, a cathode having shorter fibers may not jam against rollers of a calender system (described below) as easily as a cathode with longer fibers.

The lubricant or solvent is used to provide the cathode blend with sufficient lubrication during the extrusion process, as described below. Examples of lubricants include aliphatic solvents, aromatics (e.g., toluene and xylene), dearomatized aliphatics, and alcohols (e.g., isopropanol and butanol). Phthalates, ethers, esters, amides and ketones may also be used. A preferred lubricant is an iso-paraffinic solvent, such as Isopar, available from Exxon (New Jersey). Generally, the cathode includes between about 10% to about 80% of lubricant by weight, for example, 1.66 g Isopar per 1 g of carbon black (Vulcan XC-72). The preferred lubricant concentration, however, is a function of the type of carbon used. For example, cathode blends having carbon with high surface area or high sorption affinity for the lubricant (e.g., Black Pearl 2000) may require more lubricant than those having low surface area or sorption affinity (e.g., Vulcan carbon black). Other properties of the carbon can also influence the concentration of lubricant in the cathode blend. For example, high molecular weight lubricants are typically more viscous than low molecular weight lubricants. High molecular weight lubricants also typically have high volatilization temperatures, which can allow for high processing temperatures and long residence or processing times but may be difficult to remove from the cathode blend.

The cathode blend is typically thoroughly mixed, for example, in a double planetary mixer such as a Ross mixer. Exemplary cathode blends include 11.2% $Mn_2O_3$, 40.8% carbon, and 48% PTFE; and 12.23% $MnO_2$, 40.3% carbon, and 47.43% PTFE, to which about 40% by weight of Isopar G is added. The mixing time is a function of the quantity of the blend, typically 5 to 30 minutes.

The mixed cathode blend is sheared or otherwise exposed to forces to fibrillate the fibrillatable material. Typically, the cathode blend is fibrillated by ram extrusion to form an extrudate, such as a tape or bead. The extrudate is typically about 35–40 mils thick. The reduction ratio, which is the ratio between the cross sectional area of the barrel of the extruder and the cross sectional area of the exit slot of the die, is about 140 to 1, although other reduction ratios, e.g., 90:1 to 140:1, may be used. Generally, high reduction ratios provide high degrees of fibrillation. Ram extrusion is disclosed in Plastics Extrusion Technology, Editor F. Hensen, Oxford University Press, 1988, hereby incorporated by reference. The extrusion can be performed between 5° C. and up to 400° C., for example, in a heated die. Extruding above room temperature can increase the degree of fibrillation. Other extrusion techniques may be used. For example, continuous extrusion techniques can be used with a single screw or a twin screw extruder, a continuous mixer, a continuous processor, a reciprocating kneader, and other continuous compounding devices that can feed the extrudate directly to a calendering system.

The extrudate is calendered by passing the extrudate between two counter-rotating calendering rollers positioned at a fixed distance apart, e.g., about 2 mils to about 20 mils, which allows the cathode to be formed thin, uniform, and flexible. Generally, the extrudate is calendered under heat, typically about 30° C. to about 300° C., which can enhance fibrillation of the fibrillatable material. As the temperature of the rollers is increased such that the temperature of the extrudate increases above the softening point of the fibrillatable material, e.g., 66° F. for PTFE, the cathode can be further thinned without generating defects in the cathode. For example, calendering the extrudate at room temperature typically allows the cathode to be calendered to about 10 mils thick without tearing, but for substantially identical conditions, calendering under heat, e.g., 80° C., can produce a cathode about 3–10 mils thick without tearing. Enhanced fibrillation also changes the physical properties of the cathode, such as the tensile strength, the elongation at break, and the tensile modulus. The rollers are generally cored to allow a heat transfer medium to circulate inside to provide a uniform temperature profile across the face of the rollers.

Calendering under heat can reduce the amount of lubricant in the cathode. For example, calendaring without heat typically reduces the concentration of the lubricant from about 40% to about 30% by mechanically squeezing out the lubricant. Calendering under heat typically can reduce the concentration of the lubricant from about 40% to about 20%. Lower lubricant concentrations provide a cathode having a consistency good for bonding the cathode with the current collector during lamination, as described below. For example, a dry cathode generally does not laminate with the current collector, while a wet cathode generally has poor electrical contact with the current collector. It is believed that the lubricant allows the cathode to flow into the apertures of the current collector.

Calendering can be repeated until a desired cathode is formed. Typically, the extrudate is calendered by passing the extrudate through a set of rollers multiple times. Alternatively or in addition, the extrudate can be passed once through a calendering system having multiple sets of rollers. Calendering the cathode through multiple rollers can produce high densification, good uniformity, and better quality control of the battery's performance.

The calendering rollers can be rotating at the same speed or at different speeds. The speed of a roller controls the shear profile imparted to the cathode, and therefore, the resulting physical properties of the cathode can be adjusted. Generally, increasing the rotating speeds of the rollers increases the hardness of the cathode. If the two rollers are rotating at the same speed, the shear profile and hardness are symmetrical. If different speeds are used, for example, a speed differential of 1.05–1.20 to 1, the shear profile and hardness are asymmetrical, which can be used to tailor the cathode for optimum lamination to the current collector, as described below. Thus, one side of the cathode can be softer than another side. The softer side can be laminated to the current collector. The speed of a roller is typically about 2 ft/min to about 50 ft/min. In addition, the rollers can be tapered to promote cross-linking of the fibers, which can enhance the strength, toughness, and flexibility of the cathode. After the cathode is fed through tapered rollers, the cathode can be fed through rollers that are not tapered to produce a uniformly thick cathode.

The rate at which the extrudate is accelerated into the calendaring rollers can also be used to control the hardness of the cathode. As the rate of acceleration is increased, e.g., by increasing the linear speed of the rollers and/or by reducing the diameters of the rollers, the hardness is increased. Furthermore, the gap between the rollers can be adjusted to affect the physical properties of the cathode. Generally, tighter gaps produce harder cathodes since the rollers are applying more force on the cathode, which can cause more fibrillation.

The calendered extrudate is typically laminated or embedded to the current collector by passing the cathode and the current collector through a set of rollers to form a cathode assembly. The current collector can be, for example, a 5 mil thick, woven nickel-plated carbon steel woven mesh (GDC, Hanover, Pa.), and an expanded nickel metal collector (Delker Corp., Branford, Conn.). Typically, the rollers are rotating at the same speed, e.g., 2 feet per minute. Lamination can be performed at high temperatures, e.g., about 30° C. to about 300° C., to improve contact between the cathode and current collector by volatizing lubricant that migrate to the cathode/current collector interface. Preferably, the cathode assembly has substantially the same thickness and length (e.g., ≧90% of original thickness and thickness) as that of the calendered extrudate before lamination. No change in thickness or length indicates that the current collector is completely embedded in the cathode and that the cathode did not distort. Preferably, once laminated, the cathode cannot be removed from the current collector, that is, the cathode will tear before delamination.

Preferably, the cathode assembly is then heated to remove residual lubricant from the fibrillatable material. For example, heating can be performed at about 60–300° C., preferably 150° C., in a Class A oven for about 2 hours; at about 60 to about 300° C. in vacuo for about 2 hours; or at about 60 to about 300° C. in a convection over under an inert gas (e.g., nitrogen or argon) for about 2 hours. The cathode assembly can further be heated in an additional heating step, e.g., at about 300° C., to remove residual surfactants from the fibrillatable material.

The resulting cathode assembly is a flexible, self-supporting structure having a porous surface structure, as seen under a scanning electron microscope. The cathode assembly has fibers running along the same direction as the calendered or web direction.

The cathode assembly can be laminated with a membrane and/or a separator. The membrane, e.g., a 0.1–0.2 mm thick, air-permeable material such as PTFE, is used to restrict electrolyte from leaking out the battery. The separator is used to electrically isolate the cathode assembly from the anode so as not to short circuit the battery by direct reaction of the cathode and the anode. The separator, generally 0.05 to 0.08 mm thick, is typically a porous, electrically insulating polymer, such as polypropylene (Celgard 5550, Celanese (Summit, N.J.)) or polyvinyl alcohol (PVA), which allows the electrolyte in the anode material to contact the cathode. Alternatively, the separator can be applied in situ. For example, a solid PVA film 0.05–0.1 mm thick can be formed by coating the cathode with a 5–20% PVA aqueous solution having a defoamer and a fungicide to prevent organic growth and drying the cathode at about 60° C. In situ coated separators are described, for example, in U.S. patent application Ser. No. 09/280,367, filed Mar. 29, 1999, hereby incorporated by reference.

The laminated cathode assembly can be used to form a metal-air battery as described in U.S. patent applications Ser. No. 09/374,277, filed Aug. 13, 1999; U.S. Ser. No. 09/374,278, filed Aug. 13, 1999; and U.S. Ser. No. 09/427, 371, filed Oct. 26, 1999, each hereby incorporated by reference.

EXAMPLE 1

A cathode blend having 13% manganese oxide catalyst, 40% carbon (Vulcan XC-72), and 47% PTFE was mixed with a 40% Isopar G lubricant in a planetary mixer for 5 minutes. The cathode blend/lubricant mix was loaded into a ram extruder and preformed, at 500 psi for 2 minutes. During performing, the blend was pressed to remove air and voids.

The mix was extruded through a 2 inch wide die, resulting in a reduction ratio of 140:1, to form an extrudate. The die temperature was at room temperature, although the die heated up 30° C. from the extrusion process. The ram speed was 3 in/min, and the back pressure during extrusion ranged from 5,000 to 5,700 psi.

The extrudate was calendered at 80° C., at a roller speed of about 4 ft/min, to a target thickness of 10 mils. Half of the lubricant was lost during this calendering step, resulting in a lubricant concentration of about 20%.

The calendered extrudate was laminated to an expanded nickel metal current collector (Delker 3Ni5-050, pulled and calendered) on a Fenn calender by pre-loading the rollers and rolling the extrudate on top of the current collector. The roller speed was about 2.6 ft/min.

The cathode was dried in air at 150° C. in a Despatch class A oven for 2 hours to remove additional solvent. The cathode was laminated to a separator and a PTFE membrane, and incorporated into a size 13 zinc-air coin cell.

EXAMPLE 2

A cylindrical cathode was made by ram extruding a cathode blend as described above through a cylindrical die. The temperature of the die was about 90° C. The extruded cylinder had a wall thickness of about 0.020" and an outer diameter of about 0.430". The cylinder was self-supporting, squeezable, and can be cut. A current collector can be connected to the cathode cylinder by lamination or braiding wires, e.g., nickel, on the cathode.

EXAMPLE 3

A dual air electrode assembly was formed by the following method. A 10 mils thick cathode was formed by extrusion and calendering as described above. A 10 mils thick air layer, having 70% PTFE and 30% carbon (Vulcan XC72), was formed by extrusion and calendering. The cathode and the air layer were laminated together between rollers to a final thickness of 10 mils to form a dual layer electrode. A current collector was laminated to the air layer side of the dual layer electrode to form a dual layer electrode assembly. The assembly was dried at 60° C. for 6 hours to remove lubricant.

The assembly showed good leak resistance, good polarization performance, and flexibility. Under SEM analysis, the assembly showed no seams or cracks between the different layers. The assembly had an air permeability of 80–100 Gurley-sec, the time it takes to pass 10 cc of air through a 1 square inch sample.

Cathodes made by the above processes have been evaluated in test cells in which the current is gradually increased and the cell voltage is recorded. The performance of these cathodes are similar to those made by conventional dry coating.

A number of embodiments of the invention have been described. Nevertheless, it will be understood that various modifications may be made without departing from the spirit and scope of the invention. For example, while the description of the invention relates to a metal-air battery, the invention can also be applied to air cathodes for fuel cell applications or other applications having an air cathode.

Other embodiments are within the claims.

What is claimed is:

1. A method of making a cathode assembly, the method comprising:
   extruding a composition comprising a catalyst, a fibrillatable material, and a lubricant, to form an extrudate;
   calendering the extrudate;
   laminating the extrudate to a current collector; and
   heating the extrudate to remove at least a portion of the lubricant.

2. The method of claim 1, further comprising laminating a separator to the cathode assembly.

3. The method of claim 1, wherein the extruding of the composition is performed by ram extrusion.

4. The method of claim 1, wherein the extruding of the composition is performed at a temperature greater than room temperature.

5. The method of claim 4, wherein the extruding of the composition is performed between about 20° C. and about 300° C.

6. The method of claim 1, wherein the extruding of the composition is performed by continuous extrusion.

7. The method of claim 1, wherein the catalyst is a manganese compound.

8. The method of claim 7, wherein the manganese compound is selected from the group consisting of $Mn_2O_3$, $Mn_3O_4$, and $MnO_2$.

9. The method of claim 1, wherein the fibrillatable material comprises polytetrafluoroethylene.

10. The method of claim 1, wherein the lubricant is selected from the group consisting of aliphatic solvents, aromatic solvents, dearomatized aliphatic solvents, alcohols, phthalates, ethers, esters, amides and ketones.

11. The method of claim 1, wherein the lubricant comprises an iso-paraffinic solvent.

12. The method of claim 11, wherein the composition comprises about 10% to about 90% by weight of the iso-paraffinic solvent.

13. The method of claim 12, wherein the composition comprises about 40% by weight of the iso-paraffinic solvent.

14. The method of claim 1, wherein the calendering of the extrudate comprises pressing the extrudate between rollers.

15. The method of claim 14, wherein the rollers are moving at different speeds.

16. The method of claim 15, wherein the rollers are moving at a speed differential of 1.052–1.20:1.

17. The method of claim 14, wherein the rollers are heated to a temperature greater than room temperature.

18. The method of claim 17, wherein the rollers are heated to a temperature between about 30° C. to about 300° C.

19. The method of claim 14, wherein the rollers are tapered.

20. The method of claim 1, wherein the laminating of the extrudate to the current collector comprises embedding the current collector to the extrudate.

21. The method of claim 20, wherein the embedding of the current collector is performed above room temperature.

22. The method of claim 20, wherein the thickness of the extrudate is reduced after being embedded with the current collector.

23. The method of claim 20, wherein the thickness of the extrudate remains substantially unchanged after being embedded with the current collector.

24. The method of claim 20, wherein the embedding of the current collector to the extrudate comprises pressing the current collector and the extrudate between rollers.

25. The method of claim 1, wherein the heating of the extrudate is performed in vacuo.

26. The method of claim 1, wherein the heating of the extrudate comprises heating to greater than 100° C.

27. The method of claim 1, wherein the heating of the extrudate removes substantially all of the lubricant.

28. The method of claim 1, further comprising incorporating the extrudate into a metal-air battery after the step of heating the extrudate.

29. The method of claim 1, further comprising incorporating the extrudate into a fuel cell after the step of heating the extrudate.

30. A method of making a cathode for a metal-air battery, the method comprising:
   extruding a composition comprising a catalyst, a fibrillatable material, and a lubricant, to form an extrudate;
   calendering the extrudate between rollers; and
   pressing the extrudate to a current collector between rollers.

31. The method of claim 30, further comprising heating the extrudate to remove at least a portion of the lubricant.

32. A method of making a metal-air battery, the method comprising:

making a cathode assembly by:
- extruding a composition comprising a catalyst, a fibrillatable material, and a lubricant to form an extrudate;
- calendering the extrudate;
- connecting the extrudate to a current collector; and
- heating the extrudate to remove at least a portion of the lubricant to make the cathode assembly;

placing the cathode assembly in a housing comprising air access openings such that air entering the housing contacts the cathode assembly;

placing a separator adjacent to the cathode assembly; and placing an anode adjacent to the separator.

33. The method of claim 32, wherein the anode comprises zinc.

34. The method of claim 32, wherein the catalyst comprises manganese oxide.

35. The method of claim 32, wherein the catalyst is selected from the group consisting of noble metals, silver-based catalysts, permanganates, decomposition products of metal heterocycles, and decomposition products of napthenates.

* * * * *

UNITED STATES PATENT AND TRADEMARK OFFICE
CERTIFICATE OF CORRECTION

PATENT NO.   : 6,368,365 B1
DATED        : April 9, 2002
INVENTOR(S)  : Jean Golay et al.

It is certified that error appears in the above-identified patent and that said Letters Patent is hereby corrected as shown below:

<u>Column 8,</u>
Line 15, delete "1.052-1.20:1" and replace with -- 1.05-1.20:1 --.

Signed and Sealed this

Eighteenth Day of March, 2003

JAMES E. ROGAN
*Director of the United States Patent and Trademark Office*